April 30, 1940.  J. S. SKELLY  2,199,012
AUTOMATIC CONTROL MEANS FOR STOKERS
Filed Dec. 2, 1936  3 Sheets-Sheet 1

INVENTOR
JOHN S. SKELLY.
BY
ATTORNEY

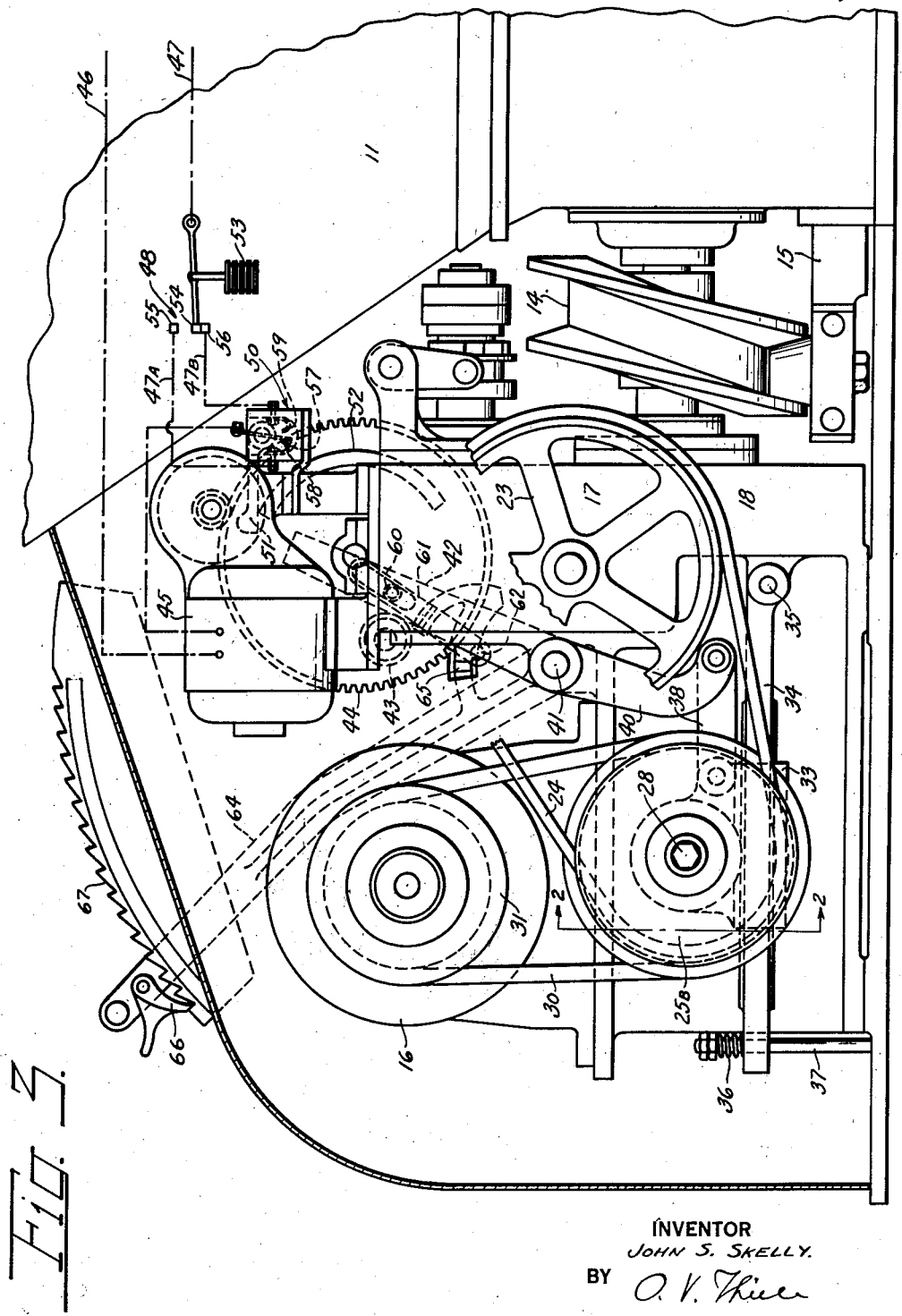

Patented Apr. 30, 1940

2,199,012

UNITED STATES PATENT OFFICE 2,199,012

AUTOMATIC CONTROL MEANS FOR STOKERS

John S. Skelly, Monongahela, Pa., assignor to Combustion Engineering Company, Inc., New York, N. Y., Application December 2, 1936, Serial No. 113,800

7 Claims. (Cl. 74—230.17)

The present invention relates to automatic control means applicable for controlling apparatus within determined operating limits. It is particularly adapted for controlling the operating rate of stokers in steam boilers in such manner as to avoid waste of fuel and increase the operating efficiency of the boiler.

In accordance with the present invention, fuel is continuously fed and air continuously supplied to the stoker. The control mechanism of the present invention responds to fluctuations in the pressure or temperature of steam to cause the operating rate to be alternately decreased to a fixed lower limit and subsequently increased to a selected high operating rate.

The objects and advantages of the invention will best be understood upon consideration of the following detailed description and appended claims when read in conjunction with the accompanying drawings, in which:

Figure 3 is an enlarged, partly diagrammatic, view of the control mechanism.

Figure 1:
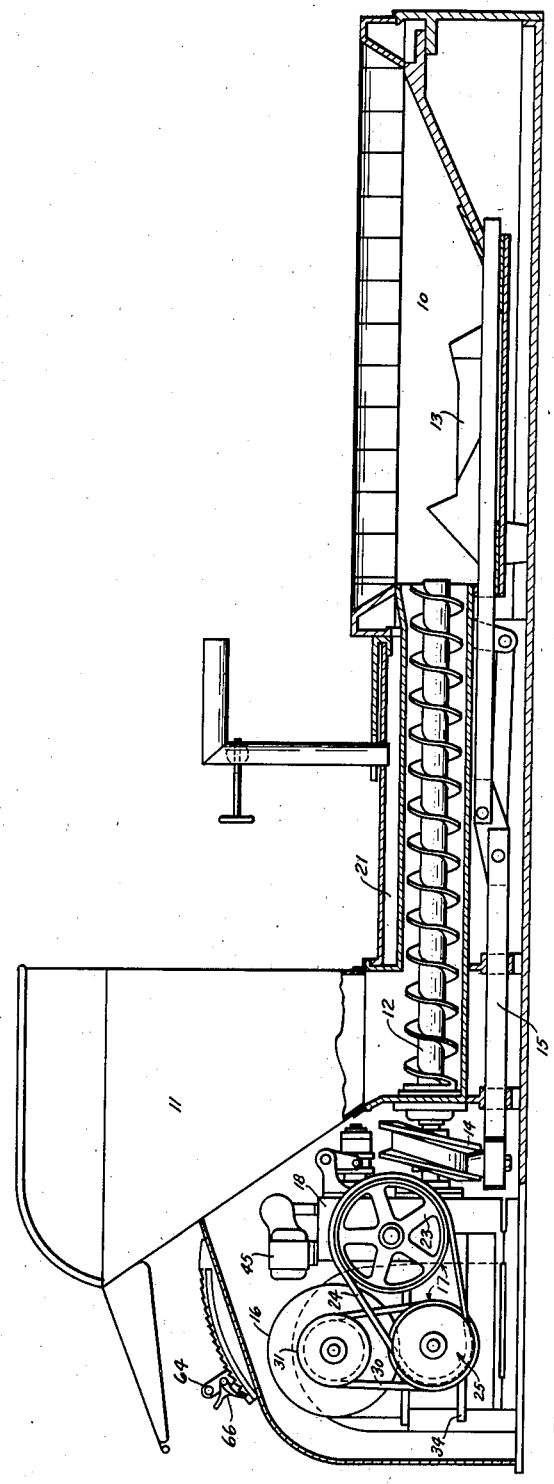
Figure 1 is a side elevational view of a stoker embodying automatic control mechanism in accordance with the invention, some parts being shown in section.
Figure 2:
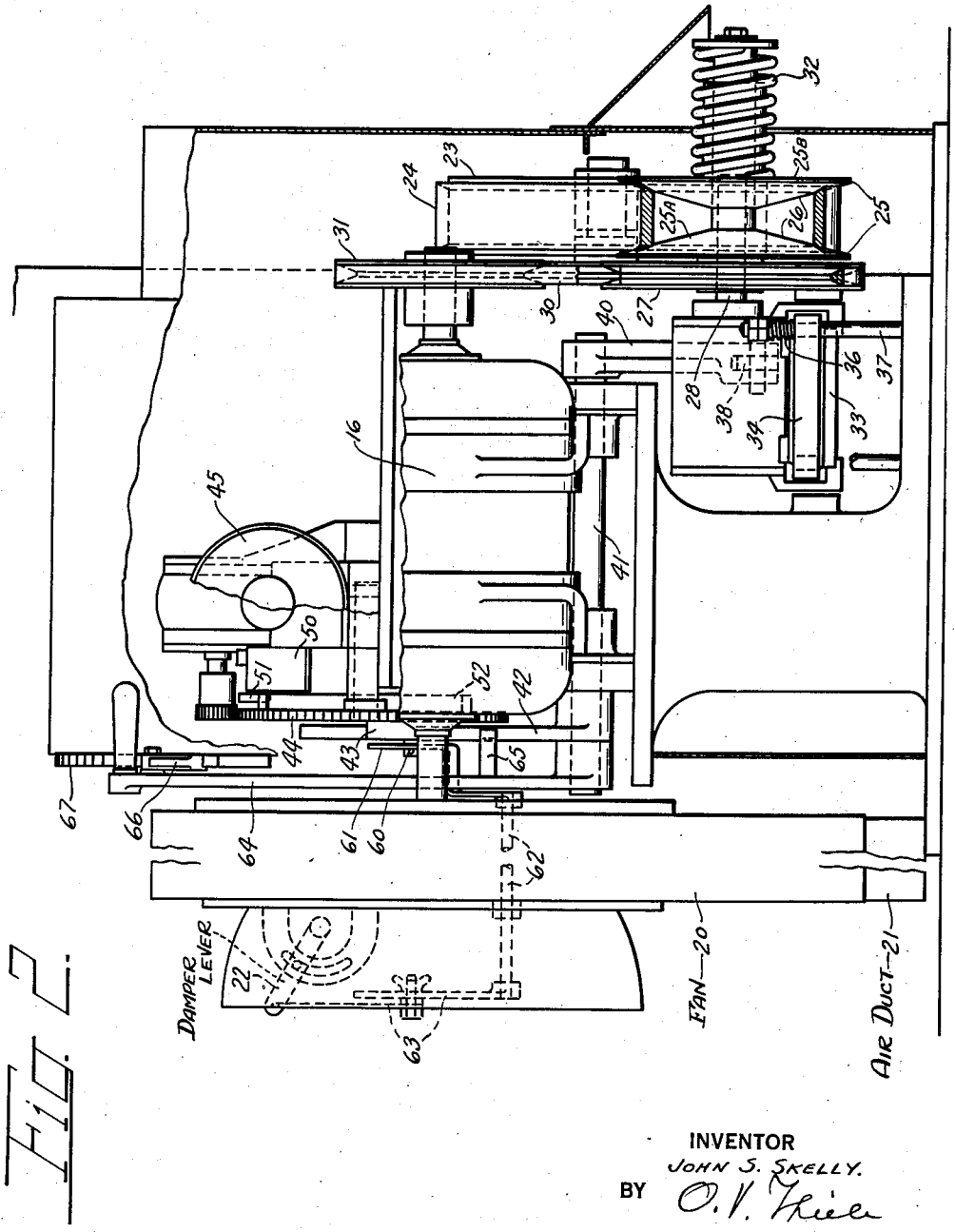
Figure 2 is a front elevational view of the operating and control mechanism for the stoker, some parts being shown in section on the line 2—2 in Figure 3 to illustrate details of construction.

The numeral 10 designates a retort of a stoker to which coal is fed from a hopper 11 by a worm 12 and along which the fuel is advanced by a reciprocating pusher 13, a cam 14 on the shaft of screw 12 acting on a roller on the pusher bar 15 to reciprocate it and the pusher. The shaft of worm 12 is operated by a motor 16 through the intermediary of a variable speed drive mechanism designated as a whole by the numeral 17 and suitable reduction gearing indicated at 18. A fan 20 driven by motor 16 supplies air to the retort through a duct 21 controlled by a damper having an operating lever 22.

In the form shown in the drawings, the variable speed mechanism 17 comprises a pulley 23 operating the reduction gearing 18, which in turn rotates worm 12 and reciprocates pusher 13. Pulley 23 is driven through a belt 24 by a composite pulley 25 consisting of members 25A and 25B having opposed frusto-conical faces 26 against which the edge of belt 24 bears. Member 25A is fixed to a pulley 27 secured to a shaft 28 and driven through a belt 30 from a pulley 31 on the shaft of driving motor 16. Member 25B is keyed to shaft 28 and slideably mounted thereon, being urged toward member 25A by a spring 32. Upon separation of the members 25A and 25B the effective diameter of the pulley formed thereby is reduced with the result that pulley 23 is driven at a lower rate of speed.

The bearing for shaft 28 which carries the composite pulley is mounted on a slide 33 movable along a track 34 which is pivotally mounted at 35. A spring 36 embracing a bolt 37 extending through the opposite end of track 34 urges the latter downwardly to maintain the belt 30 associated with the driving motor under proper tension as the slide for the composite pulley is moved along the track. The bearing for the composite pulley, or the slide 33 on which it is mounted, is connected by a link 38 to an arm 40 secured to a shaft 41 which, upon oscillation, acts to shift the slide along the track to alter the effective diameter of the composite pulley. When arm 40 is turned clockwise slide 33 is moved to the left along the track 34, Fig. 1, and tends to tauten belt 24 so that the latter acts on the frusto-conical faces 26 of the members 25A and 25B to move the member 25B outwardly against the tension of spring 32. For the purpose of facilitating the separation of the members 25A and 25B when the belt 24 is placed under tension the latter is provided with bevelled edges so that it is wedged shaped. An advantage of this construction in variable speed drive mechanisms of this type which employ belts and pulleys reducible in effective diameter, is that it is necessary to adjust only one pulley to maintain the same effective length and tension of the belt on speed changes as contrasted with previous devices requiring that the diameters of both drive and driven pulley be changed. The above described variable speed mechanism is more fully shown and described in my earlier Patent No. 2,070,756, issued February 16, 1937.

The stoker is continuously operated at rates alternating between a determinedly fixed lower speed and a variably determinable upper speed in response to fluctuations in steam pressure, or temperature if desired, by effecting automatic adjustment of the variable speed regulating device 17.

Shaft 41 carrying the oscillatable arm 40, which acts to shift the composite variable speed pulley member 25B, has fixed thereto a lever 42. Lever 42 is positioned in the path of a roller 43 carried by a gear 44 driven by a motor 45 mounted on the casing for gearing 18. Motor 45 is connected to power leads 46, 47 subject to the control of a pair of double throw switches 48, 50, the latter having a weighted operating arm 51 disposed in the rotative path of a cam 52 carried by the gear 44.

Upon a rise in the steam pressure a device 53 responsive to the change in condition shifts the movable contact 54 of switch 48 into engagement with the contact 55 thereof, completing the circuit of motor 45 via branch 47A through the movable contact 57 of switch 50 which is in engagement with the fixed contact 58 thereof. As motor 45 drives gear 44 counterclockwise the roller 43 moves lever 42 clockwise. This movement of lever 42 acts through arm 40 to shift the composite pulley 25 of the variable speed drive 17 to the left, along track 34 to place belt 24 under tension and causing it to effect separation of the two parts of the pulley as described above, with the result that the speed of the stoker is reduced.

Lever 42 is adjustably connected by a link 60 with an arm 61 fixed to a rock shaft 62 acting through a lever system 63 to actuate the operating lever 22 of the damper controlling the admission of air to duct 21 through which air is supplied to the stoker by fan 20. Thus, the air supply is also cut down when the rate of coal feeding is reduced.

As the gear 44 rotates, cam 52 thereon maintains engagement with the arm 51 of switch 50 for approximately a half revolution of the gear. When cam 52 rides from beneath arm 51, the latter, being weighted, drops and shifts the movable contact 57 of switch 50 from engagement with its contact 58 into engagement with its other contact 59. This results in breaking the branch circuit 47A of motor 45 and preparing the branch circuit 47B. Thus, the movement of lever 42 is automatically terminated when it has been moved an amount sufficient to reduce the stoker speed to its lower operating rate.

When the steam pressure falls to a predetermined point the device 53 responds so that the movable contact 54 of the switch 48 engages the contact 56, completing the circuit via branch 47B and motor 45 is again placed in operation. As the motor resumes lever 42 follows the counterclockwise movement of roller 43. This counterclockwise movement of lever 42 is caused by spring 32 urging the part 25B of composite pulley 25 toward the part 25A thereof and acting through belt 24, slide 33, arm 40 and shaft 41 to cause lever 42 to follow roller 43. If desired, a separate return spring might be provided for lever 42. The extent of counterclockwise movement of lever 42 and, hence, the upper limit of speed to which the rates of operation of the stoker and fan 20 are increased is variably controllable. An adjustable lever 64 loosely mounted on shaft 41 has a lug 65 positioned to be engaged by lever 42 as it turns counterclockwise and to stop its return movement in a position corresponding with that in which the lever 64 is locked by a latch 66 thereon engaging a quadrant or rack 67.

While lever 42 follows roller 43, throughout part or all of its movement, to increase the operating rate of the stoker, cam 52 moves toward and into engagement with the arm 51 of switch 50. As the cam raises the lever the movable contact 57 of switch 50 disengages contact 59 and re-engages contact 58. This results in opening the circuit of motor 45 thereby stopping it and also reconnecting it with the contacts 55, 58 in branch 47A so that the motor may again be placed in operation when the device 53 responds to a subsequent rise in steam pressure.

It is believed that the operation of the control apparatus of the invention may be readily understood from the above description. Briefly recapitulated, a rise in steam pressure, or temperature if desired, closes switch 48 completing the circuit to the control motor 45 via branch 47A. As the motor turns gear 44 through a half revolution lever 42 is shifted to the right, Fig. 3, reducing the rate of operation of the stoker to its predetermined lower limit. The branch circuit 47B of motor 45 having been partially closed at the contact 59 of switch 50 is completed at contact 56 of switch 48 when the steam pressure falls to a predetermined value. In the second half revolution of gear 44 switch 50 remains closed until cam 52 raises arm 51. As roller 43 partakes of the movement of gear 44 in its second cycle, lever 42 follows it throughout its movement unless stopped in an intermediate position by engagement with the lug 65 on the manually settable lever 64. Thus, lever 64 in one extreme position determines the lower limit of the operating rate for the stoker and in its other extreme position determines the maximum upper limit of the speed range. When lever 64 is set in its extreme left hand position, Fig. 3, it does not interfere with the return movement of lever 42 and the latter follows roller 43 throughout its movement and the rate of operation of the stoker is increased from its fixed lower limit to its maximum rate of operation under the conditions assumed and described herein. In any position short of the extreme left hand position of lever 64 its lug 65 is engaged by lever 42 in its return movement and throughout the remainder of the cycle roller 43 moves away from lever 42. This results in increasing the rate of stoker operation from its fixed lower limit to a higher rate, which, however, is lower than its maximum rate of speed, as determined by the setting of lever 64.

With the apparatus described above the stoker is maintained in continuous operation at rates varying in accordance with fluctuations between determined values of pressure of the steam generated in the boiler. As a consequence of regulating the coal feed and air supply to suit the demand for steam, the fuel bed does not coke or cake over and thus create an unsatisfactory condition of the fuel bed resulting in waste of fuel and requiring slicing as occurs when a stoker is stopped on the rise of pressure and remains out of operation until the selected values, whether pressure or temperature, fall to a lower point.

What I claim is:

1. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a member movable in opposite directions between determined limiting positions for adjusting said regulating means to vary the speed of said driven shaft over a determined range between predetermined low and high operating rates; a motor associated with said member, means operated by said motor and controlling the movements of said member in reverse directions to said limiting positions; means for setting said motor in operation; and means for automatically stopping said motor upon operation of said means thereby to an extent sufficient to move said member to either of its limiting positions.

2. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a member movable in opposite directions between determined limiting positions for adjusting said regulating means to vary the speed of said driven shaft over a determined range between predetermined low and high operating rates; a motor associated with said member; means operated by said member and controlling the movements of said member in reverse directions to said limiting positions; means for setting said motor in operation; means for automatically stopping said motor upon operation of said means thereby to an extent sufficient to move said member to either of its limiting positions; a stop for limiting the movement of said member toward one of said positions; and means for adjusting said stop to terminate the movement of said member short of said one position and acting to change one limit of the operating range of said driven shaft.

3. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a member movable in opposite directions between determined limiting positions for adjusting said regulating means to vary the speed of said driven shaft over a determined range between predetermined low and high operating rates; a motor; means operated thereby and engageable with said member for moving it in one direction to one limiting position thereof for adjusting said regulating means to decrease the speed of said driven shaft to said low operating rate; means for setting said motor in operation to effect said movement of said member; means for automatically stopping said motor upon operation of said means thereby to an extent sufficient to remove said member to said one limiting position; means for setting said motor in operation to move said member engaging means away from said member to permit reverse movement of the latter toward its other limiting position; means for moving said member reversely to its other limiting position for adjusting said regulating means to increase the speed of said driven shaft to its high operating rate; and means for automatically stopping said motor upon operation of said means thereby to an extent sufficient to move said member to said other limiting position.

4. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a lever controlling said regulating means and oscillatable between determined limiting positions for adjusting said regulating means to vary the speed of said driven shaft over a determined operating range between upper and lower rates of operation; a motor; a member operated by said motor and engageable with said lever to move it in one direction to one limiting position thereof for adjusting said regulating means to decrease the speed of said driven shaft to its lower rate; means for setting said motor in operation; means for automatically stopping said motor upon operation of said member thereby to an extent sufficient to remove said lever to said one limiting position; means for setting said motor in operation to move said member away from said lever to permit reverse movement thereof toward its other limiting position; means for moving said lever reversely for adjusting said speed regulating means to increase the speed of said driven shaft; means adjustable to stop said lever during said reverse movement in a position short of said other limiting position and acting to diminish said operating range of said driven shaft; and means for automatically stopping said motor upon movement of said member thereby to an extent sufficient to permit full movement of said lever to said other limiting position in which said lever effects increase in the operating range of said driven shaft to its upper limit of operation.

5. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a control lever movable in opposite directions between determined limiting positions for adjusting said regulating means to vary the speed of said driven shaft over a determined range between predetermined low and high operating rates; cyclically operating means acting in one part of its cycle of operation to move said lever to one of its limiting positions for adjusting said regulating means to change the speed of operation of said driven shaft in one sense and acting in the remainder of its operating cycle to permit return of said lever towards its other limiting position for adjusting said regulating means to change the speed of operation of said driven shaft in the opposite sense; means for automatically terminating the actuation of said cyclically operating means at the end of each part of its operating cycle; and means for moving said lever toward said other limiting position.

6. In variable speed drive mechanism having a drive shaft operating at a constant rate of speed; a driven shaft, means operably connecting said drive shaft to said driven shaft, and regulating means adjustable to vary the speed at which said drive shaft operates said driven shaft; a control lever movable in opposite directions between determined limiting positions for adjusting said regulating means to vary the speed of said driven shaft over a determined range between predetermined low and high operating rates; cyclically operating means acting in one part of its cycle of operation to move said lever to one of its limiting positions for adjusting said regulating means to change the speed of operation of said driven shaft in one sense and acting in the remainder of its operating cycle to permit return of said lever towards its other limiting position for adjusting said regulating means to change the speed of operation of said driven shaft in the opposite sense; means for automatically terminating the actuation of said cyclically operating means at the end of each part of its operating cycle; means for moving said lever toward said other limiting position; means for limiting the movement of said lever; and means for adjustably positioning said limiting means and acting on said lever to vary the degree of change in the rate of operation of said driven shaft in said opposite sense.

7. In variable speed drive mechanism having a drive shaft operating continuously at a constant rate of speed, a driven shaft, means operably connecting said drive shaft to said driven shaft and regulating means adjustable to vary the speed at which said drive shaft operates said driven shaft; a lever for said regulating means movable in one direction to decrease and in the opposite direction to increase the speed of said driven shaft over a determined range between predetermined low and high operating rates; a motor; means setting said motor in operation; a member operable by said motor and engageable with said lever to move it in one direction for adjusting said regulating means to decrease the speed of said driven shaft; means for setting said motor in operation to move said member away from said lever; means for moving said lever in said opposite direction for adjusting said regulating means to increase the speed of said driven shaft; control means operable to stop said motor; and cam means operated by said motor and cooperating with said control means to stop said motor upon movement of said lever to an extent in either direction of movement thereof sufficient to readjust the speed of said driven shaft to the upper and lower limits of its operating range.

JOHN S. SKELLY.